United States Patent [19]

Merle et al.

[11] 4,438,634

[45] Mar. 27, 1984

[54] FREEZE CONCENTRATION APPARATUS

[75] Inventors: Rene Merle, New Hope; Myron Uecker, Buffalo; Robert Kozlik, Minneapolis, all of Minn.

[73] Assignee: General Mills, Inc., Minneapolis, Minn.

[21] Appl. No.: 439,448

[22] Filed: Nov. 5, 1982

[51] Int. Cl.³ .......................... B01D 9/04; C02F 1/22
[52] U.S. Cl. ...................................... 62/123; 62/342; 62/533; 62/544
[58] Field of Search .................. 62/123, 124, 343, 342, 62/532, 533, 544, 545

[56] References Cited

U.S. PATENT DOCUMENTS

| | | | |
|---|---|---|---|
| 2,552,524 | 5/1951 | Cunningham | 62/123 |
| 2,913,344 | 11/1959 | Stallings, Jr. | 62/545 |
| 2,986,012 | 5/1961 | Toulmin, Jr. | 62/544 |
| 3,319,437 | 5/1967 | Goins | 62/123 |
| 3,681,932 | 8/1972 | Huber et al. | 62/123 |
| 3,713,303 | 1/1973 | Nilsson et al. | 62/532 |
| 3,801,285 | 4/1974 | Meisenberg et al. | 62/123 |
| 3,902,855 | 9/1975 | Lynch | 62/532 |

*Primary Examiner*—Ronald C. Capossela
*Attorney, Agent, or Firm*—Gene O. Enockson; John A. O'Toole

[57] ABSTRACT

Disclosed is an apparatus useful in freeze concentration processes such as in the concentration of fruit juices. The apparatus performs both the recrystallization and ice-liquid separation steps of conventional freeze concentration systems. The apparatus comprises an inclined trough divided into zones by dams including, in sequence, a recrystallizer, an ice breakup, an ice drainage and an ice discharge zone. The apparatus is provided with a variable speed, rotating paddle auger with variably pitched paddles which advances, lifts, and breaks up the ice along the trough. The liquid concentrate is discharged through one or more discharge ports spaced along the bottom of the trough. The ice is discharged at the high end of the trough through a discharge chute.

10 Claims, 6 Drawing Figures

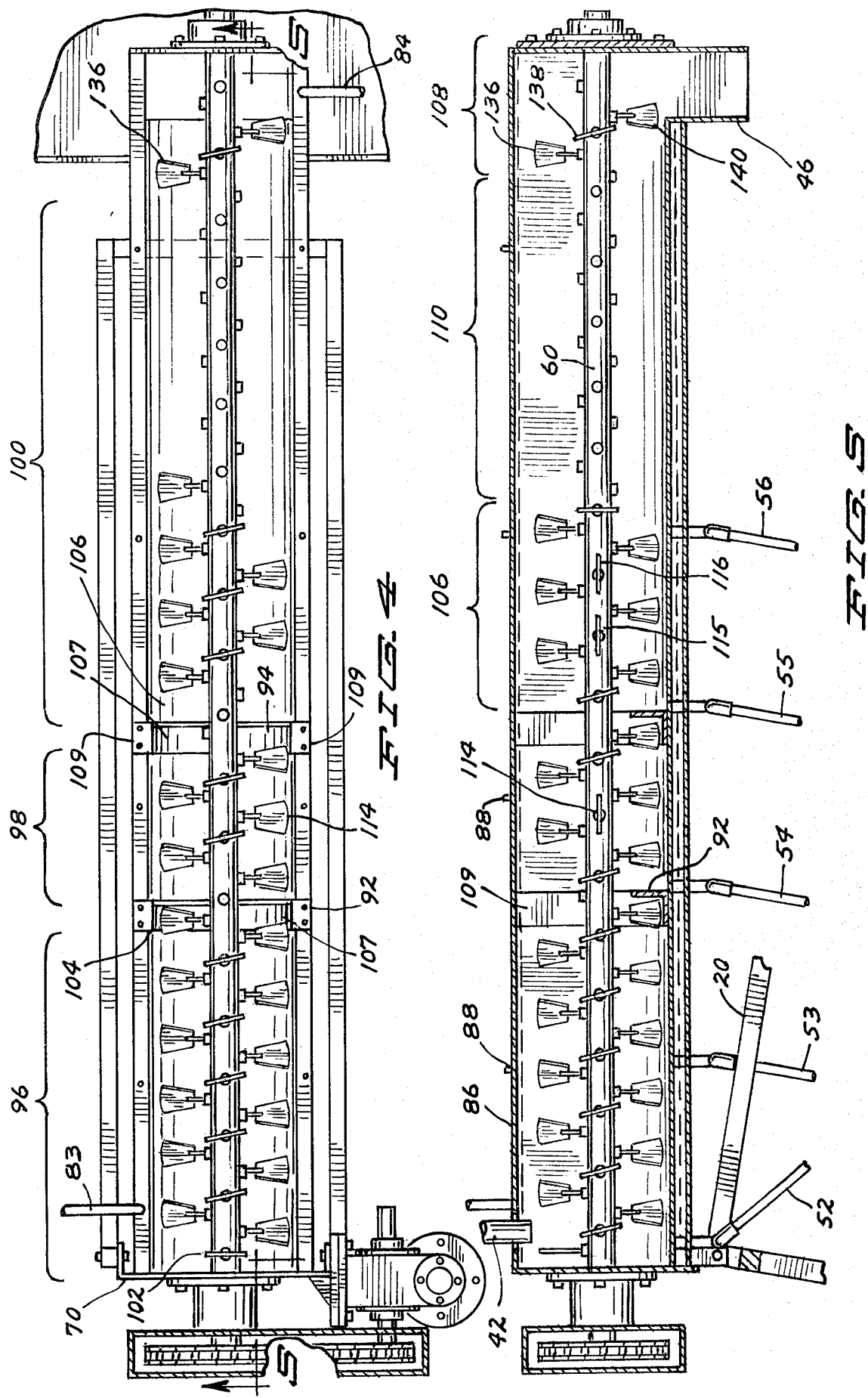

FREEZE CONCENTRATION APPARATUS

1. TECHNICAL FIELD OF THE INVENTION

The present invention relates to freeze concentration apparatus. In particular, the present invention relates to apparatus for the treatment of food products such as fruit juices to remove water by freeze concentration.

2. THE PRIOR ART

A variety of aqueous solutions are desirably concentrated. Numerous concentration unit operations and apparatus to perform such unit operations are known. These concentration operations include, for example, evaporation, freeze concentration, reverse osmosis, and freeze drying. In the evaporation techniques, the aqueous solution is heated and the water is removed by evaporation. One of the drawbacks to evaporation techniques is that many components of aqueous solutions, particularly liquids such as fruit juices, are subject to thermal degradation. Additionally, many of the constituents which contribute to flavor and/or aroma are highly volatile and are driven off by the elevated temperatures or are even stripped off by the vacuum conditions under which evaporation is commonly performed.

Freeze concentration, reverse osmosis, and freeze drying are operations which are typically performed at reduced temperatures and/or under atmospheric or pressurized conditions and thus find particular utility for those aqueous solutions requiring concentration and which contain thermally sensitive and/or volatile materials. Unfortunately, known techniques and apparatus for each of these methods are complex and capital intensive.

The present invention relates in particular to freeze concentration, especially food liquids such as fruit juices. Conventional freeze concentration is well described in "Freeze Concentration of Fruit Juices," by Deshpande et al., *Food Technology*, May, 1982. Freeze concentration involves concentration by partial freezing of the food liquid and subsequent separation of the resulting ice crystals leaving a liquid concentrate.

Known freeze concentration systems exist in several variations. Since large ice crystals are easier to separate from the concentrate, many systems attempt to control the crystal size during initial freezing. Other systems produce smaller ice crystals initially but include a recrystallizer component in the system which provides for the growth of larger crystals over periods of time at the expense of or sacrificing the smaller ice crystals. Both batch or continuous (i.e., with a recycle, e.g., the Grenco freeze concentration process, see "Freeze Concentration of Food Liquids," product catalogue 1982, Grenco Special Applications, B.V.) processes are known. Other variations exist in the ice-liquid separation step. Techniques and equipment for this step include (1) hydraulic piston presses and screw presses, (2) centrifuges, and (3) wash columns.

While freeze concentration provides numerous advantages compared to other concentration techniques, it is not without its disadvantages. One primary disadvantage is that known freeze concentration systems comprise several complex equipment components which result in known systems being relatively capital intensive.

It has been surprisingly discovered that a single relatively simple apparatus can be constructed which performs both the recrystallization and ice-liquid separation operations of freeze concentration. Thus, the present single apparatus can replace the complex and expensive multi-component systems known in the art, and, accordingly, the present invention provides a less expensive alternative to known apparatus. Other advantages of the present invention are described below in the detailed description of the preferred embodiments.

BRIEF DESCRIPTION OF THE DRAWINGS

FIG. 4 is a top sectional view taken along lines 4—4 of FIG. 1;

FIG. 5 is a longitudinal sectional view taken along lines 5—5 of FIG. 4; and

DESCRIPTION OF THE PREFERRED EMBODIMENTS

The present invention relates to an apparatus which is useful in the freeze concentration of solutions, particularly food liquids or beverages, e.g., fruit juices. The present apparatus can substitute for conventional separate recrystallization and wash column units. The apparatus comprises an inclined trough divided into zones which perform the unit operations of recrystallization, ice breakup, drainage of concentrate from the ice, and ice discharge.

Figure 1:
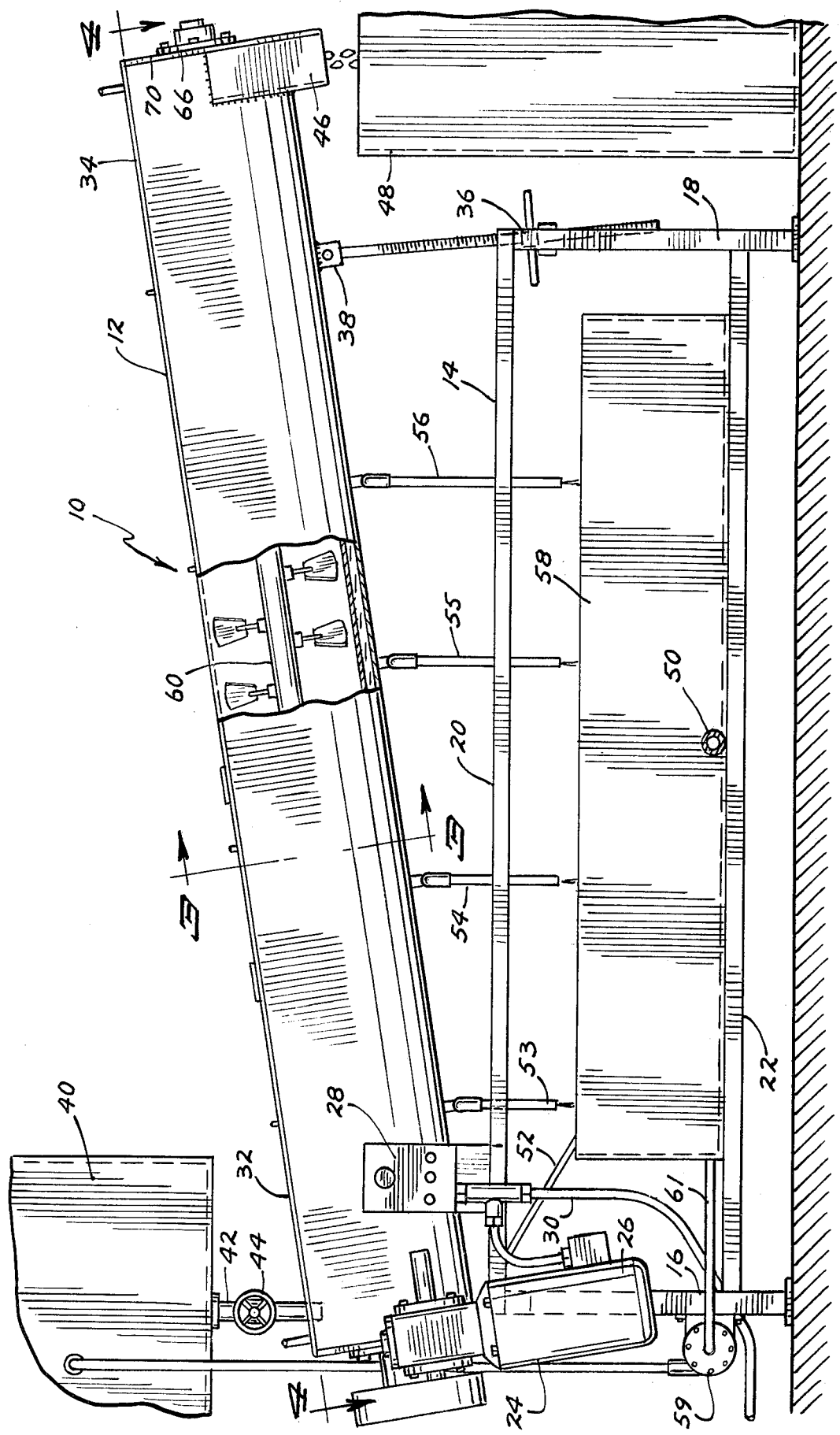
FIG. 1 is a side view, partially cut away, of one embodiment of the present apparatus.

Referring now to the drawings, and to FIG. 1 in particular, there is shown an embodiment of the present freeze concentration apparatus which is designated generally by reference numeral 10. As can be seen, the present apparatus 10 is an essential component of a freeze concentration system which additionally includes a freezer 40 and a means for recirculating a liquid concentrate such as the combination of a collecting pan 58 and a recirculating pump 59.

The freezer 40 is conventional in design. The freezer serves to partially freeze the liquid to be freeze concentrated to form a slush comprising ice crystals dispersed throughout a liquid portion or phase. The freezer includes a means for controlled feeding of the slush to the present apparatus 10 such as a freezer discharge or feed pipe 42 controlled by a valve 44.

The apparatus 10 includes a laterally extending trough or body 12 which can be supported by a frame 14. The trough 12 has a first or feed end 32 which opposes the second or discharge end 34. As is common for food processing equipment, stainless steel construction is preferred for the present apparatus.

The feed pipe 42 discharges the slush from the freezer to the trough 12 proximate the feed end 32 thereof. At its other end, the trough 12 includes a downwardly projecting discharge chute 46 proximate the discharge end 34 which discharges the ice crystals conveniently to a holding tank 48 which tank is not part of the present apparatus. The apparatus does comprise a plurality of discharge pipes or ports in the underside of the trough 12 such as pipes 52, 53, 54, 55, and 56 for discharge of the concentrated liquid from the apparatus 10 which can, if desired, gravitationally feed to the collecting pan 58 which is conveniently positioned below the trough 12. If desired, the liquid concentrate discharged from the individual discharge pipes can be collected separately or in various combinations with one another. One or all of the ports can be used.

The liquid concentrate collected in the pan 58 is gravitionally fed through pipe 61 to the pump 59 which recirculates the liquid concentrate to the freezer 40. The collecting pan 58 further includes a valved collection pipe 50 for collecting or drawing off the liquid concentrate.

The frame 14 supporting the trough 12 is conventional in design and generally includes a first and second pair of vertical support members 16 and 18 and a first and second pair of horizontal members 20 and 22. While not shown, if desired, the frame 14 can be supplied with casters or other means for moving the apparatus. The frame is essentially provided with means for elevating the discharge end 34 such as an elevational screw 36 assembly pivotally engaging a pivot mount 38 affixed to the underside of the trough 12. Desirably, the means for elevating the discharge end allows the trough 12 to be inclined up to about 30° from horizontal.

As seen in the partially cut away section of the trough 12 in FIG. 1, the apparatus 10 includes an auger 60 and means 24 for variably rotating the auger 60 which can include a conventional variable speed motor 26 controlled by a rheostate 28 and powered by a power supply 30. The auger 60 extends transversely along the length of the shaft and is supported or journal to the trough 12 at each end by bearing members 66 mounted at the respective ends to an opposed pair of end plates 70.

Figure 2:
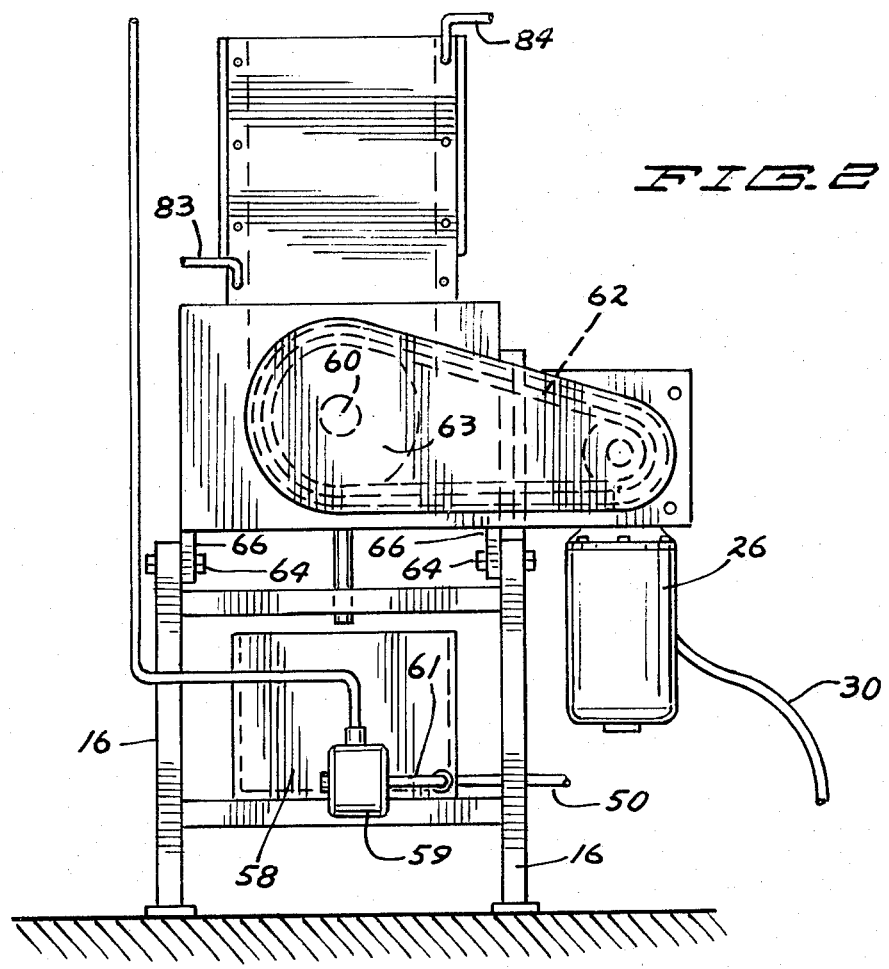
FIG. 2 is an end view of the apparatus partially in relief.

A brief reference is now made to FIG. 2 which shows that the motor 26 is in driving engagement with a shaft or auger 60 by means of conventional drive chain 62 which engages a conventional sprocket gear 63 keyed or welded to the auger 60. It is further seen that the trough 12 is pivotally mounted on the frame at the inlet end 32 by any conventional pivot means such as an opposed pair of pivot pins 64 aligned through pivot eyes 66 attached to the underside of the trough 12 and further extending through suitable bores in the vertical support members 16.

Figure 3:
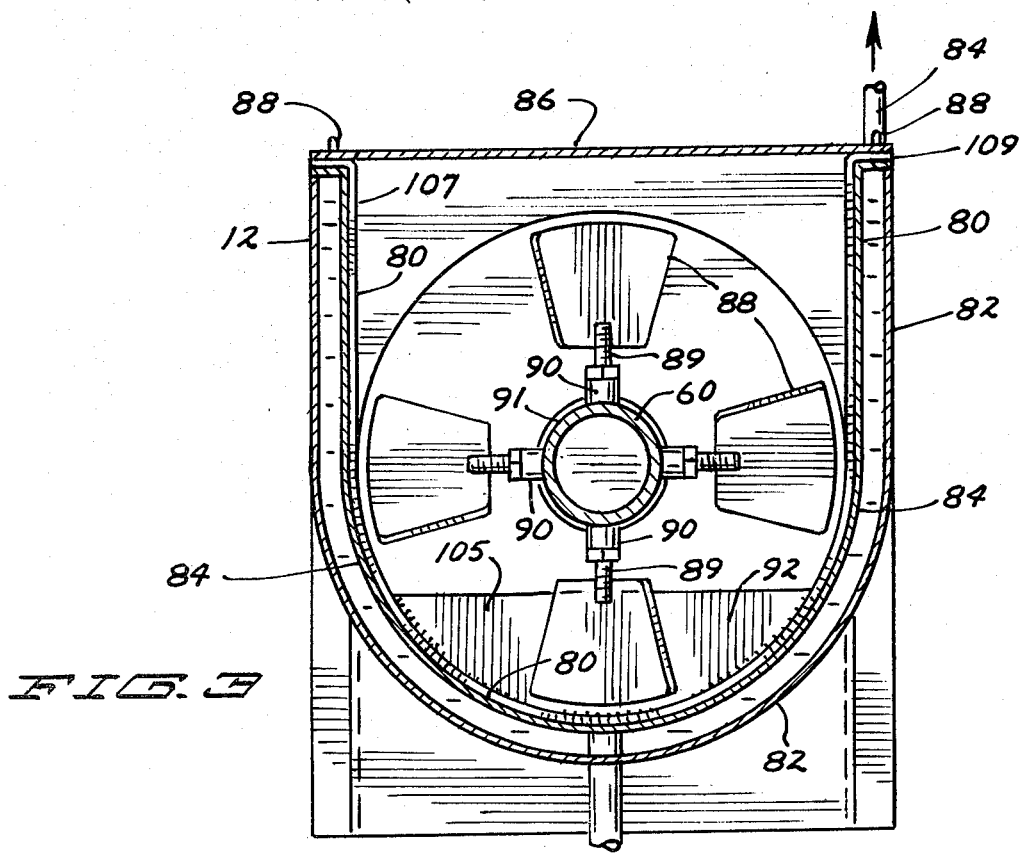
FIG. 3 is a cross sectional view of the apparatus taken along lines 3—3 of FIG. 1.

Reference now is made to FIG. 3 which depicts that the trough 12 is double walled and is fabricated with an opposed pair of trough "U" shaped panels 80 and 82 which define a half-cylindrical or circular well portion 84. The double walled construction allows for cooling the trough 12 with a coolant, if desired, e.g., freon or propylene glycol so as to control the temperature of the material being concentrated. Referring back briefly to FIG. 2, it is seen that the apparatus is provided with a heat transfer fluid inlet valve 83 and exit valve 85. The apparatus may also include a top or guard plate 86 which may be removably secured to the trough by conventional means such as by a plurality of upwardly projecting stems 87 which project through matching bores (not shown) in the top plate 86. In one embodiment of the present invention, the top plate 86 is made from a clear plastic such as plexiglass so that operation of the auger 60, during material processing can be observed. In another embodiment of the present invention not depicted herein, the top plate may include seal means to provide for a closed container which may be pressurized so that the operation can be practiced with a blanket of inert gas, e.g., nitrogen.

The auger 60 can comprise a hollow cylindrical shaft or tube 91. FIG. 3 further shows that the auger 60 is provided with a plurality of adjustable paddles 88 with the paddles' axes at right angles to the axis of the auger 60. The paddles 88 are adjustably attached to the auger 60 by means of set screws 89 threaddedly engaged in a plurality of threaded farrells 90 on the auger 60. Such a construction allows for rotational adjustment of the paddles 88 relative to the farrells. The paddles may be rotated such that the axis of the auger may be in the same plane as the paddle, i.e., 0°, or may be rotated up to 90° such that the paddle plane is perpendicular to the axis of the auger 60. The farrells 90 project from the auger 60 at regular intervals and at 90° to each other forming a helical pattern on the auger 60. It is further seen that the well portion 84 is provided with a first dam 92 which can be adjustably positioned along the length of the trough 12.

Referring now to FIG. 4, it can be seen that the trough 12 is divided into three sections by means of the first dam 92 and a second dam 94 thereby defining (1) a first or recrystallizer section or region 96, (2) a first agitated separation section or region 98, and (3) a second agitated separation section or region 100. It can be seen that most of the paddles in the various sections are at from about 10° to 30° from being perpendicular to the axis of auger 60. This paddle orientation provides a forwarding action to the slush advancing along the length of the trough 12. Certain of the paddles may be sported (i.e., perpendicular to the axis) such as paddle 102, 104, and 106 to prevent undesired contact of the paddle with the trough end panel 70 or the dams 92 or 94.

FIG. 4 also shows that the dams 92 and 94 are each fabricated from a "U" shaped band member 107 conforming to the shape of the trough 12 and having a pair of horizontal top pieces or sections 109 at the opposed ends of the band which lie over the upper end of the trough panels 80 and 82. The dam additionally comprises a vertically oriented, semi-circular planar piece 105 conforming to the well portion 84 which is secured to or mounted on the band member 107 by suitable means, e.g., simple welding. Such a construction provides for damming the lower half cross sectional area of the trough. The dam is adjustably secured to the trough 12 by suitable means, e.g., having the top pieces 109 provided with one or more bores through which the stems 87 may project. Additional securing means can include "C" clamps (not shown).

As better seen in FIG. 5, one or more of the paddles 88 such as paddles 114, 115, and 116 may be rotated so as to be in the same plane as the auger's axis 60 so as to provide an uplifting action to the slush or ice as the auger 60 is rotated. Such paddles are referred to as uplifting paddles.

Referring still to FIG. 5, it is seen that the ice drainage section 100 is itself subdivided into three zones including a paddle zone 106, a discharge zone 108, and an intermediate zone 110. The intermediate zone is characterized by an absence of paddles and is referred to herein as the "inclined drain column" zone. The absence of paddles in zone 110 allows ice to be deposited around the auger 60 and buildup forming a loose packed, rough cylinder or column (described further below). The discharge zone 108 is defined by a region proximate the discharge chute 46 wherein the auger 60 includes a plurality of paddles such as shave paddle 136 and paddles 138 and 140.

OPERATION OF THE INVENTION

Figure 6:
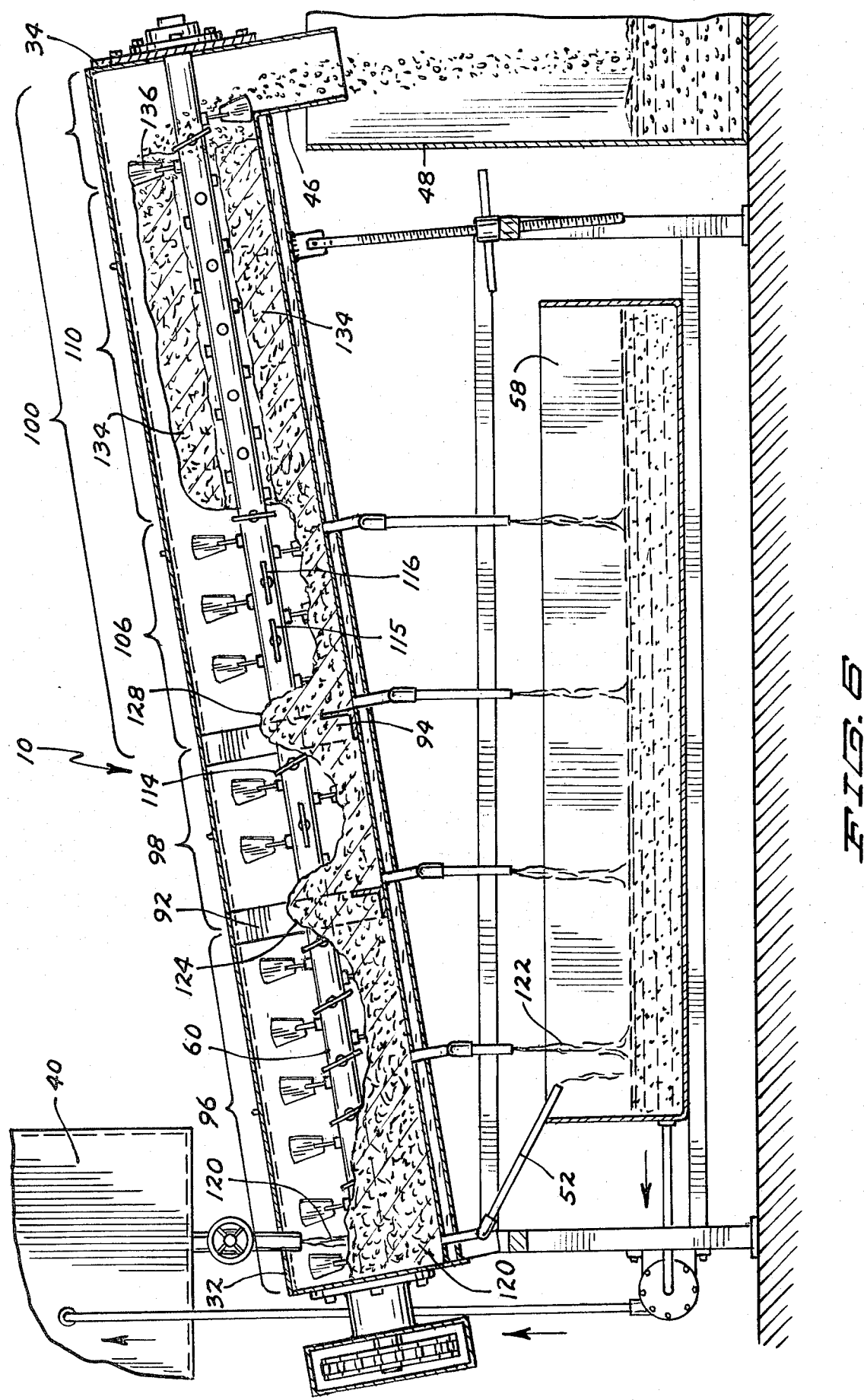
FIG. 6 is an operational view of the apparatus shown as a longitudinal section similar to that of FIG. 5.

The operation of the present apparatus is shown in FIG. 6. A partially frozen mixture 120 which is to be freeze concentrated is fed, such as by gravity feed, from the freezer 40 into the feed end 32 of the trough 12. The partially frozen mixture thus comprises an ice crystal fraction and a liquid phase fraction. Exemplary materials which can be freeze concentrated with the present apparatus include, for example, fruit juices, e.g., single strength orange juice, wine, coffee brew, and the like. As the partially frozen material exits the freezer, it is characterized by a large number of smaller ice crystals and is thus referred to as a "slush."

In the recrystallizer zone 96, the paddle configuration provides a modest forwarding action to the slush, advancing it up and along the length of the trough 12. With an auger 60 rotational speed of 1-3 RPM and with the trough discharge end inclined about 15° from horizontal, the slush mixture has sufficient residence time in this section so that the ice crystals continue to grow. This is accomplished by the smaller crystals melting so that the larger ones can grow larger still at their expense. As the slush moves up and along the trough 12, a buildup of slush 124 occurs around the first dam 92. The buildup of slush 124 allows for drainage of a liquid concentrate 122 from the more pure ice crystals. The uplifting paddles provide an upward action to the slush thus providing for further ice buildup and for the concentrate to drain therefrom. The drainage of the liquid concentrate 122 is aided by virtue of the elevation of the discharge end 34 of the trough 12 relative to its feed end 32. While elevation of the trough up to an angle of about 30° from horizontal is contemplated, in the preferred embodiment the angle desirably ranges from about 10° to 20°. The slush is then carried over into the first agitated separation region 98. In the zone 98, the ice crystals are noticeably larger and tend to form hardened clumps of ice which require breakup by the uplifting action of the uplifting paddle 104 so as to allow greater drainage of adhering liquid in order to minimize solids loss due to carry-over of the liquid with the ice. A second ice buildup 128 proximate the second dam 94 similarly allows for drainage of the liquid from the ice crystals.

In the third section 100, the ice crystals are again broken up in the paddle zone 106 by the uplifting action of uplifting paddles 115 and 116. The ice is then carried along and allowed to form a cylinder or column of ice 134 surrounding the auger 60 in the inclined drain column zone 108. In this zone 110, the ice cylinder 134 is allowed to drain further. By this time the ice will be relatively completely drained of adhering liquid and thus extended drainage times are required to obtain the small amounts of liquid still adhering to the ice. Finally, in the discharge zone 108, the end face of the ice cylinder 134 is shaved by the shave paddle 136 and the shaved ice is carried to the discharge chute 46 where it falls by gravity into the holding tank 48 for further processing or disposal.

Since the trough 12 is inclined with the ice discharge end 34 elevated relative to the feed end 32, the liquid phase gravitates towards the feed end. The concentrated liquid 122 may be withdrawn at one or more of the several discharge pipes. Generally, the liquid concentrate 122 runs counter-current to the ice flow, thus the most highly concentrated liquid is obtained from the discharge pipe 52 located nearest the feed end 32. Generally, however, the concentration gradient of the concentrated liquid from the various discharge pipes is small and thus are commonly fed to the collecting pan 58.

In a typical manner of operation, with fruit juice such as orange juice, entering the apparatus 10 at a serum solids concentration of about 12%, about 50% of the liquid will be removed as ice in a single pass through the present apparatus 10 and thus the concentrated liquid 122 will have concentration of about 21%. Total residence time for a single pass typically ranges from about 2 to 4 hours. The ice crystal fraction or phase comprises relatively pure water. However, small amounts of solids are undesirably occluded by or otherwise associated with the ice crystals. If desired, the ice crystals may be further processed to recover these associated residual solids.

The concentrated liquid 122 collected in the collecting pan 58 may then be refrozen and reprocessed or concentrated in the present freeze concentration system until desired end point concentrations are achieved. Concentrations up to about 40-45% solids can be realized with the present apparatus employing several staged operations. The liquid concentrated to desired solids levels can then be withdrawn from the present system from the collecting pan 58 through the collection pipe 50.

What is claimed is:

1. An apparatus useful in the freeze concentration of partially frozen slush having an ice crystal phase and a liquid phase, comprising:
   a trough having a first end and an opposed second end;
   means for elevating the second end relative to the first end;
   means for feeding the slush to the trough proximate the first end;
   means for discharging the ice crystal phase proximate the second end;
   means for discharging the liquid phase from the underside of the trough;
   auger means for advancing the slush along the trough;
   a first means for damming the slush, said first dam means adjustably mounted in said trough thereby defining a recrystallizer section of the trough; and
   second means for damming the slush adjustably mounted in said trough intermediate the first dam means and the ice crystal discharge means thereby defining a first ice drainage section and a second ice drainage section of the trough.

2. The apparatus of claim 1 wherein the auger means comprises:
   an auger rotatably mounted in the trough wherein the axis of the auger is longitudinally aligned with the trough; and
   means for rotating said auger about its longitudinal axis.

3. The apparatus of claim 2 wherein the auger includes:
   an auger shaft having a plurality of farrells spaced apart and projecting outwardly perpendicular to the shaft axis and wherein the farrells are at 90° to each other forming a helical pattern on the auger shaft;
   a plurality of paddles; and means for adjustably mounting the paddles in the farrells allowing for adjustable rotation of the paddle relative to the farrell.

4. The apparatus of claim 3 wherein the second drainage section includes a first region proximate the second dam wherein the auger includes a plurality of paddles, a second region proximate the ice crystal discharge means wherein the auger includes a plurality of paddles, and a third region intermediate said first and second regions wherein the auger is free of paddles.

5. The apparatus of claim 4 wherein the liquid phase discharge means includes a plurality of discharge ports in the underside of the trough.

6. The apparatus of claim 5 wherein the trough includes means for controlling the temperature of the frozen slush.

7. The apparatus of claim 6 wherein the temperature control means includes a trough double wall defining a heat transfer region; inlet means for feeding a heat transfer fluid to the heat transfer region; and outlet means for discharging the heat transfer fluid from the heat transfer region.

8. The apparatus of claim 7 wherein at least one of the paddles in the ice drainage section is oriented such that the auger axis is in the same plane as the paddle.

9. The apparatus of claim 8 wherein the elevation means includes a frame having a pivot means for pivotably supporting the first end of the trough on the frame at one frame end, and an elevating screw at the opposed frame end pivotably mounted to the underside of the trough proximate the trough second end.

10. The apparatus of claim 9 wherein the first dam means and second means each include
- a band member conforming to the shape of the trough;
- a vertically oriented member conforming to the shape of the bottom of the trough secured to the band member;
- adjustable means for securing the band member to the trough.

* * * * *